United States Patent
Johnsen et al.

[15] 3,683,939
[45] Aug. 15, 1972

[54] PROTEINACEOUS COSMETIC MATERIAL FOR HAIR CONDITIONING

[72] Inventors: Vernon L. Johnsen, La Grange; Raymond S. Burnett, Chicago, both of Ill.

[73] Assignee: Wilson Pharmaceutical & Chemical Corporation

[22] Filed: May 28, 1970

[21] Appl. No.: 41,594

Related U.S. Application Data

[63] Continuation-in-part of Ser. No. 548,374, May 9, 1966, abandoned, which is a continuation-in-part of Ser. No. 301,970, Aug. 14, 1963, abandoned.

[52] U.S. Cl. ............132/7, 8/111, 8/127.51, 424/DIG. 2, 424/62, 424/70, 424/71
[51] Int. Cl. ............A45d 7/04, A61k 7/06
[58] Field of Search ........424/70, 95, 71, 62; 195/29; 132/7; 8/127.51, 111

[56] References Cited

UNITED STATES PATENTS

| | | | |
|---|---|---|---|
| 2,431,256 | 11/1942 | Keil et al. | 195/29 |
| 2,834,771 | 5/1958 | Mitchell et al. | 260/117 |
| 2,928,822 | 3/1960 | Johnsen et al. | 260/117 |

OTHER PUBLICATIONS

Sagarin, " Cosmetics–Science & Technology," (1957) p. 423
Schimmel, " Schimmel Briefs" (1965) No. 358, Schimmel & Co., Newburgh, N.Y.

*Primary Examiner*—Albert T. Meyers
*Assistant Examiner*—Vincent D. Turner
*Attorney*—Dressler, Goldsmith, Clement and Gordon

[57] ABSTRACT

The invention relates to compositions useful in cosmetics and particularly adapted for the treatment of hair, made up of water and 5 to 60 percent of polypeptides having a Formol Nitrogen value in the range between 8 and 17, which polypeptides are the product of subjection of collagen-containing material to heat in the presence of water under conditions of temperature, pressure and time whereby the gel forming character of the protein hydrolysate is reduced, of removal of anions from the hydrolysate by ion exchange and of further hydrolyzing of the hydrolysate with enzyme material having proteolytic activity.

11 Claims, No Drawings

PROTEINACEOUS COSMETIC MATERIAL FOR HAIR CONDITIONING

This application is a continuation-in-part of application Ser. No. 548,374, entitled "Proteinaceous Cosmetic Material", filed May, 9, 1966, now abandoned, which application was in turn a continuation-in-part of application Ser. No. 301,970, filed August 14, 1963, and now abandoned.

This invention relates to proteinaceous material derived from collagen-containing material. More particularly, it relates to a non-antigenic type of proteinaceous material. Still more particularly, it relates to aqueous compositions containing proteinaceous material having permanent absorption characteristics when used in the care of hair.

In accordance with this invention, proteinaceous materials are produced of an average molecular weight in the range between about 500 and 1,500 which are water soluble. The aqueous compositions of the proteinaceous materials have utility per se as fermentation media and as components of cosmetics, such as ointments for the treating of skin, and restorer of damaged cuticles for hair, hair cleansing and grooming compositions such as hair lotions, tonics, bleaches, shampoos, and the like.

In many uses of proteinaceous materials, for example, in cosmetic and pharmaceutical products, not only must the protein additive be low in color and bland in odor but it must also be low in ash, must be capable of at least maintaining an equilibrium moisture content and be of a character which is adsorbed, absorbed or both when applied to hair.

The color, odor and ash requirements can be met by many protein compositions. If properly processed these requirements can also be met by most collagen derivatives such as gelatin. High viscosity and stable gel forming ability of gelatin, however, produces undesirable texture. The relatively low temperature at which the relatively high molecular weight gelatin converts aqueous preparations to a viscous, difficult to dispense liquid, makes its use undesirable for many purposes. In addition, proteins of the molecular weights characterizing most protein compositions including gelatin, i.e., 15,000 and higher, are not absorbable into the hair in any appreciable quantities.

The gel forming disability of gelatin can be reduced or eliminated by subjecting collagen or derived gelatin to high temperatures and pressures in the presence of steam and/or water. Treatment under these conditions, however, eliminates the gelation effects only to accentuate others, namely, heightens objectionable odor and deepens the color in the solution. Bleaching with hydrogen peroxide can minimize the color situation but the result is a product of even more objectionable door.

In an attempt to improve the character of gelatin in cosmetic uses, for example, in hair grooming compositions, the proteinaceous materials have been hydrolyzed with acids or with bases. The disadvantages of these hydrolyzed products has been the difficulty in obtaining uniformity in hydrolysis and the high salt or ash content resulting from the necessity to neutralize the hydrolyzing agents.

Now we have discovered that proteinaceous material which when used in, for example, hair grooming compositions, is capable of sorption into the hair, imparts gloss, renders the hair manageable and acts as a humectant, can be produced by processing collagen to obtain a proteinaceous extract whose components are of a specific molecular weight size range. This processing, for example, may convert collagen directly to a non-gelling material by the one step process of subjecting raw material which contains collagen to high temperatures and pressures in an aqueous system or indirectly by first preparing gelatin and then destroying its gelling character by subjecting it to heat and water, and thereafter the proteinaceous material is hydrolyzed with proteolytic enzymes to the degree required to have a product having a Formol Nitrogen value in the range between about 8 and 17, characterized by being straight chain polypeptides free of sulfur-containing amino acids and completely soluble in aqueous media over the entire pH range of 1 to 12.

In a preferred embodiment of the invention, collagen-containing material is treated in aqueous solution with a sulfite agent to minimize development of color during heating and solubilization and the hydrolyzed protein obtained through treatment with heat and water is subjected to hydrolysis action of proteolytic enzymes to reduce the polypeptides to a mixture of proteinaceous materials having a Formol Nitrogen value in the specified range, preferably in the range between 9 and 14. In those instances where a light color and bland odor are highly desirable such as in hair grooming compositions, the components present in the hydrolyzed material which cause the solid proteinaceous products to darken during drying and which are responsible for off odors, can be largely removed by solvent extraction with alcohols, by following hydrolysis of the collagen-containing material in the presence of sulfur dioxide with a peroxide treatment for alteration of sulfur compounds, by contacting the product of hydrolysis in the presence of sulfur dioxide with ion exchange materials, either prior to or subsequent to the enzyme hydrolysis, etc.

When processing to obtain non-gelling proteinaceous products, the presence of sulfite radical in solution during the high temperature treatment of the proteinaceous material is desirable because it inhibits development of appreciable color during the processing. Odor and flavor, including residual sulfite taste, and such color or bodies capable of developing color upon subsequent heating, which remain in the heat treated proteinaceous material can be substantially eliminated by, for example, contacting the solution of hydrolyzed proteinaceous material with ion exchange materials prior to or subsequent to enzyme hydrolysis.

In accordance with a preferred embodiment of the invention, given to illustrate a method of preparing the products useful in hair treating compositions, a proteinaceous product of reduced gelling character is derived directly from collagen containing material and associated proteins found in such sources as bones, skins, hides, sinews, fatty tissues, and the like, by subjecting them to high temperatures and pressures with steam and/or water. Reduction of the proteins to water soluble condition and reduction of the gelling ability of the proteins by heating is carried out in the presence of sulfite ion. Such solubilizing and heating may be carried out in a single heating operation or one in which there is a partial solubilizing in the absence of sulfite ion followed by complete solubilization and/or elimination of gelling character while heating in the presence of sufficient sulfite ion to minimize development of color.

Sulfite ion may be introduced into the aqueous solution of proteinaceous material by dissolving sulfur dioxide gas in the water to form sulfurous acid, by adding water soluble salts of sulfurous acid, and equivalent operations. The amount of sulfite ion required will depend upon the temperature level of the heat treatment and the type of equipment utilized for the cooking operation. Sufficient sulfite must be present so that at least 1,000 ppm, preferably 2,000 ppm (based on solids in solution), remain after the cooking operation to assure obtaining a light colored product. Other conditions being equal, the higher the temperature and the longer the time of heating, the larger the amount of sulfite required. Generally, an amount of sulfite agent is added which is capable of introducing into the solution between 0.1 percent and 1.5 percent of sulfate, i.e., $SO_3$, ion on a weight of the solids in solution basis.

Conditions of processing or the type of equipment used will govern the choice of the sulfite agent. Sulfur dioxide, which dissolves in an aqueous solution to form sulfurous acid may be used advantageously in jacketed pressure vessels that are not heated by direct steam because $SO_2$ introduction does not involve the introduction of ash forming cations. When vessels are used which are heated and pressurized by passing steam directly into the mixture, use of sulfur dioxide gas is uneconomic due to loss in the continuously vented gases. When the solutions of proteinaceous matter are to be heated in vented vessels, the common salts of sulfurous acid such as sodium sulfite, potassium sulfite, sodium bisulfite, potassium bisulfite and mixtures thereof are utilized because of their greater stability under the conditions of the pressure cooking.

The extent of the heat treatment required to eliminate the gelling characteristic of the proteinaceous material will aqueous with the type of collagen-containing raw material and with the type of end product desired. A product with virtually no gel strength can be obtained from most collagenous materials by cooking at 35 pounds to 65 pounds gauge steam pressure, i.e., at temperatures in the range between about 275°F. and 310°F. for from 2 to 5 hours.

More in detail, the process of producing a non-gelling polypeptide product from collagenous material may involve an aqueous leach or acid steep operation prior to heating or cooking of the proteinaceous matter. Such pretreatment steps dissolve salts naturally occurring in the tissues and bones. Discard of the pretreatment solutions eliminates a major portion of the salts which would otherwise carry through the process to the finished product. Polypeptide products produced from leached or steeped collagenous materials, particularly mineral acid steeped materials tend to exhibit greater freedom from turbidity when the solutions thereof are adjusted to or are introduced into another solution where the pH maintained is within the range of about 1.5 to 4.5.

Elimination of salts by steeping sources of collagenous material in hydrochloric acid or sulfuric acid is similar to the process used to produce ossein from animal bones. Following a steep in acid solution, the residual proteinaceous solids, which are to be heat treated in aqueous solution to produce polypeptides of low gelling character, are water washed to remove excess acid, and solubilized mineral material.

Collagen-containing material, subsequent to any steeping or washing treatment is subjected to a heating or cooking to solubilize the collagen. The leached collagenous material is heated in an aqueous medium such as water or dilute acid at temperatures in the range between about 205°F. and 350°F. in the presence of between 0.1 percent and 1.5 percent of sulfite ion on a solids content of the solution basis. After cooking, insoluble solids and fat are separated from the water solution. The extract containing heat-hydrolyzed proteinaceous material will contain varying amounts of residual sulfite depending upon the amount of sulfurous acid or salts thereof utilized and the type of processing equipment used. The extract will usually have, in 1 percent solution, a Lovibond color in the range between yellow 1 to 4 and red 0.2 to 1.2 whereas a solution cooked in the absence of sulfite ion will generally show in 1 percent solution a Lovibond color in the range of yellow 5 to 8 and red 1.6 to 3.0.

Inasmuch as the extracts are dilute solutions, it may be preferable at this stage to effect a partial concentration. Extract solutions are generally concentrated by evaporation of water to a solids content of between 20 percent and 55 percent by weight, preferably between about 35 percent and 50 percent. This preliminary concentrate may have suspended mater removed therefrom, for example, by mixing with filter aid and then filtering the resultant slurry through a precoated filter to obtain a substantially fat and insoluble solids-free solution of non-gelling proteinaceous material.

Clarified concentrate of non-gelling proteinaceous product is adjusted to the optimum range of acidity for enzyme action, i.e., to a pH in the range between 5 and 8. A solution of proteolytic enzyme, for example, a 10 percent to 25 percent by weight solution of papain, is added to produce a digestion solution containing from about 0.1 percent to 0.5 percent papain based on the weight of solids in solution. The solution is maintained at a temperature in the range between about 100°F. and 180°F., preferably between about 140°F. and 170°F. and the end point determined by the conventional Formol Nitrogen test. Depending upon the average molecular weight of the proteins desired, the digestion is continued until a Formol Nitrogen value in the range of about 8 and about 17 is obtained and preferably when the intended use of the product is in cosmetics where it is applied to hair, in the range between about 9 and 14. Suitable proteolytic enzymes for the purposes of this invention are papain, bromelin, ficin, trypsin, and the like.

Products of Formol Nitrogen value in the range of about 8 to 17 having the properties described, when the molecular weight is determined in accordance with standard procedures, will have a number average molecular weight in the range between about 500 and 1,500.

To terminate the enzyme action, the solution is heated to an enzyme deactivating temperature, generally to a temperature in the range between about 195°F. and 215°F. for an appropriate length of time, for example, 15 to 30 minutes.

After enzyme hydrolysis, the concentrate of polypeptides is a solution having a pH generally in the range between about 5.7 and 6.7. The concentrate is contacted with material containing groups capable of ion exchange, i.e., anion exchange alone or cation and anion exchange together irrespective of the order of treatment. The liquid product of ion exchange with anionic material generally will have a pH in the range between 8 and 9 whereas the products subjected to both anionic and cationic materials will have a pH in the range between about 4.5 to 5.5. The hydrogen ion concentration of the ion exchanged concentrate is adjusted if necessary using organic acids such as citric acid to produce a pH in the range between about 4.5 and 7, preferably between about 5.5 and 6.5, and the product may, if desired, by dehydrated. After enzyme hydrolysis, the extract may be diluted or may be passed as a concentrate directly to ion exchange apparatus.

Non-darkening non-gelling proteinaceous products are produced through the removal of whatever elements may be responsible for darkening by suitable means such as ion exchange. Suitable anionic exchange materials are those known to the trade as Amberlite IR-45 (weak base primary amines), Amberlite IR-402 (strong base quaternary ammonium hydroxide) Rohm and Haas IRA-68 and Duolite A-30T (intermediate base tertiary amine), and the like. Since anion exchange resin treatment results in removal of acidic ions, the solution becomes more alkaline. A slight darkening of the solution occurs due to the pH increase. However, since the pH of the solution at this stage of processing is too high for most applications, it is necessary to lower the pH with acid, preferably phosphoric or citric, prior to drying. Upon lowering of the pH, the solutions become lighter in color. Lovibond color readings of solutions entering and leaving the anion resin vessel, when measured at slightly acid pH value, show virtually no change. However, the Lovibond color method lacks the sensitivity necessary to measure small color differences. Evidence of removal of color and color precursers by the resin is shown by the highly colored resin eluate that is obtained during regeneration of the resin with alkali.

If a low ash product is desired, treatment with various combinations of anionic and cationic resins can be used. The preferred combination for treatment is contact first with an anionic exchange resin of weak base strength properties followed by treatment with a strong acid resin such as Amberlite IR-120 H which combination can reduce the ash content of the final product produced from the solution having an approximately 2.2 percent ash content to approximately 0.03 percent.

While extract solutions maintained at temperatures above about 45°F. can be passed through the ion exchange beds, it is preferably to effect the ion exchange when the solutions are at a temperature in the range between about 150°F. and 200°F. Warm solutions generally are pumped through the ion exchange bed under a pressure of about 25 to 50 pounds gauge.

Contact time of the protein solution with the resin influences the quality of the final product, especially with regard to odor and flavor, when the dried product is made up into solutions.

For example, when a 40 percent solution of filtered material obtained by processing pigs' feet is passed through a vessel containing 2 cubic feet of resin at a rate of 1 gallon per minute, the pH of the effluent is 8.5. When a sample of the solution is adjusted to 5.5, the solution has a slightly unpleasant odor and a slightly bitter taste. When a similar procedure was used, i.e., a procedure differing only in that the material was passed through the resin vessel at a rate of one-half gallon per minute, solutions of the dried material are substantially odorless and tasteless.

In the use of such exchange resins as are referred to above, regeneration is carried out using regenerants and techniques recommended by the resin manufacturer.

Proteinaceous compositions obtained from collagen containing materials having a Formol Nitrogen value in the range between about 8 and 17, which correspond roughly to a molecular weight in the range between about 500 and 1500, have utility per se in the treatment of hair, have utility in cosmetics, for example, in facial cream emulsions and when added to hair treatment formulations such as shampoos, bleaches, dyes, waving lotions, and the like, in amounts in the range between about 5 percent and 60 percent by weight of the composition, provide striking differences in cleaning, manageability, modification of damaged hair, and protection against destructive effects of chemical agents.

Proteinaceous materials, i.e., polypeptides of Formol Nitrogen values, for example, in the range of 4 to 7 and in the range of 18 to 20, i.e., polypeptides of molecular sizes outside the range of 8 to 17, do not impart the unique properties exhibited by the products of this invention. While we do not wish to be tied to a theory, it appears and the hereinafter set forth examples support the theory that the difference in the treatment of hair is the permanancy of the bonding of polypeptides of this invention to the hair into which it is absorbed. Polypeptides of relatively large molecular weight compared to applicants' product, i.e., Formol Nitrogen values of 3 to 7, exhibit temporary adsorption to the surface of hair, are not absorbed to any significant extent and show a lack of bonding to the hair by having a substantial portion thereof removed from the hair simply by rinsing. Polypeptides of relatively smaller molecular weight compared to applicants' products, i.e., of Formol Nitrogen values of 18 or higher, exhibit temporary absorption into the hair but show a significantly reduced amount of bonding to the hair by being desorbed in significant amounts during rinsing.

The instant proteinaceous compositions provide effective action because they are absorbable and significant amounts thereof remain absorbed permanently into the hair, facts establishable due to the presence of a characterizing chemical, hydroxyproline, an amino acid not present in proteinaceous material derived from sources other than collagen-containing materials.

When hair is cleaned and dried and the hair is treated with an aqueous solution containing the polypeptides of the invention, sorption, in general, increases with increase in concentration of the polypeptides, increases with decrease in molecular size of the polypeptides and increases with increase in damage to hair, i.e., the least amount of polypeptide is sorbed to virgin hair, more is sorbed by bleached hair and still larger amounts are sorbed to hair simultaneously being treated with or previously treated with chemical waving agents.

In determining the sorption, a particular batch of hair, for example, virgin hair, is subjected to immersion in a water solution of polypeptides or to bleaching with a 6 percent solution of hydrogen peroxide or to hair waving with a solution containing 6.0 percent of ammonium thioglycollate when the solutions contain 5 percent to 10 percent of the polypeptide. The hair strands are removed from a particular treatment solution, blotted on cleansing tissue and immersed in 2 ml of distilled water for five minutes with occasional agitation. The hair is then removed, blotted on cleansing tissue and immersed in another 2 ml portion of distilled water. This immersion rinsing is repeated generally 5 to 10 times depending upon the peptide concentration in the treating solution.

The rinse waters, generally only the first, fifth and tenth rinses were analyzed for hydroxyproline, as well as the rinsed hair. Analysis of hair treated with polypeptides and then thoroughly rinsed with water shows little permanent absorption of polypeptides of ranges of Formol Nitrogen values outside the range of 8 to 17, as evidence by the substantial leaching out of the hair of the proteins which contain hydroxyproline. When hair is treated with polypeptides having a Formol Nitrogen value less than 8 or greater than 17, amounts of absorbed polypeptides remaining in the hair after rinsing are insignificant when compared with polypeptides having a Formol Nitrogen value within the range of 8 to 17. Analyses of the rinsed hair shows the following:

| Hair | Treating Agent Polypeptide FN Value | Micrograms Sorbed Per 10 Mg of Hair |
|---|---|---|
| Virgin | 4 – 6 | 4 |
| Virgin | 8 – 17 | 15 |
| Virgin | 19 – 22 | 4 |
| Bleached | 4 – 6 | 25 |
| Bleached | 8 – 17 | 50 |
| Bleached | 19 – 22 | 15 |
| Wave lotion treated | 4 – 6 | 17 |
| Wave lotion treated | 8 – 17 | 190 |
| Wave lotion treated | 19 – 22 | 60 |

Concentration of polypeptides of Formol Nitrogen value outside the range of 8 to 17, in treating solutions, shows little effect on the quantities of polypeptides permanently sorbed.

When bleached hair is treated with a 5 percent solution of a polypeptide, of Formol Nitrogen value of 12, for 30 minutes and then rinsed five times, the amount of polypeptide remaining absorbed is 68 micrograms per 10 mg of hair. When the same type bleached hair is treated with a 10 percent solution of a polypeptide of Formol Nitrogen value of about 5 for 30 minutes, and then rinsed five times, the amount of polypeptide remaining absorbed is 16 micrograms per 10 mg of hair. The latter quantity of absorbed polypeptide shows no substantial increase in absorption over the absorption of corresponding polypeptides from solutions of lower concentration. Comparison of the absorption obtained by the treatment of hair with a solution having twice the concentration of polypeptides of Formol Nitrogen value of 5, as was used in the test of polypeptides of a Formol Nitrogen value of 12 shows approximately 400 percent greater permanent sorption of the product having a Formol Nitrogen value of 12.

Rinse water analysis show little leaching of hydroxyproline into the fifth and subsequent rinse waters where hair is treated with polypeptides having a Formol Nitrogen value of 8 to 17. Analyses of a particular rinsed hair show 3 to 15 micrograms of polypeptides sorbed to 10 milligrams of virgin hair, 15 to 50 micrograms sorbed to 10 mg of bleached hair and 10 to 190 micrograms per each milligram of wave lotion treated hair.

Variation in sorption of polypeptides is in part dependent upon the type of treatment being given the hair being tested and in part dependent upon condition of the hair due to prior treatments. Hair which has been subjected to no deteriorating treatments (virgin hair) hair) will sorb the least amount of polypeptides whereas badly damaged hair will sorb the greatest amount of polypeptides. For example, after virgin hair and bleached hair are treated for 30 minutes with a solution containing 5 percent of polypeptides of Formol Nitrogen value varying from 9 to 17, the rinsed samples of hair show absorption in micrograms, as follows:

|  | 5% FN 9 | 5% FN 12.6 | 5% FN 17 |
|---|---|---|---|
|  | (Micrograms) | (Micrograms) | (Micrograms) |
| Virgin Hair | 7 | 8 | 8 |
| Bleached Hair | 21 | 18 | 16 |

These Formol Nitrogen values correlate with molecular weight approximately as follows:

| Formol Nitrogen Values | Molecular Weight |
|---|---|
| FN 8 | 1500 |
| FN 9 | 1250 |
| FN 12.6 | 1000 |
| FN 17 | 500 |

From these values, it is apparent that virgin hair sorbs approximately the same amount of polypeptides over the molecular weight range of 500 to 1,500, whereas bleached hair sorbs considerably greater quantities of polypeptides although the greater the molecular weight, the less polypeptide that is absorbed.

Material having a molecular weight in the range between 500 and 1,500 may be prepared as illustrated in the following examples. The products used in the above set forth test showing Formol Nitrogen values of 9, 12.6 and 17. These were the products of Examples II, III and IV. These examples are intended to be illustrative only and are not to be construed as limitations on the invention.

EXAMPLE I

Eighteen thousand pounds of ground pigs' feet are steeped in cold water for 2 hours. The water is drained off and ground feet covered with water a second time and then again drained. The feet are then covered with cold water which contains 25 pounds of sulfur dioxide gas, and after steeping the ground feet overnight, this solution is drained off.

A calcium bisulfite solution is then prepared by passing liquid $SO_2$ into a slurry of 27 pounds of calcium carbonate until the solution becomes clear. This solution, plus enough hot water to cover the ground feet, is then added to the container containing the leached ground feet. The material is then cooked with steam at 40 pounds gauge pressure (267°F.) for 2 hours.

After cooking, the melted fat is drawn off and the aqueous layer is removed. A second cook is then carried out, with added water at 5 pounds pressure, for one-half hour. This liquid extract is removed and combined with the first cooked water extract and evaporated to 55 solids. Approximately 3,850 pounds of concentrated material is obtained. The material was filtered and split into portions A, B, C and D.

To portion A of the extract solution which had Formol Nitrogen of 5.6 percent and a pH of approximately 6 was added 10 pounds of a solution containing 10 percent by weight papain so as to produce hydrolysis solution having a papain content of approximately 0.2 percent based upon solids in solution. The solution was held at 140°F. for a total of 19 hours, following which the solution was heated to 200°F. to deactivate the enzyme. At the end of that time the Formol Nitrogen value of the digest was 11.2 percent.

This enzyme treated extract is filtered and passed through a tower containing approximately 12 cubic feet of anionic exchange resin. After flow of liquid is passed through the tower at a rate of 2 gallons per minute, the pH of a composite sample of the effluent is 8.7. The $SO_2$ content in ppm on a solids basis is less than 100. After adjustment of the pH to 5.5 with citric acid, the extract is reconcentrated to 55 percent solids. A 1 percent solution of this material has a Lovibond color of 1.0 yellow, 0.0 red. Solutions of the material are substantially free of odor and flavor.

EXAMPLE II

To portion B of the liquid product of Example I was added approximately 10 pounds of the same 10 percent solution of papain, so as to produce a hydrolysis solution having a papain content of approximately 0.2 percent based upon solids in solution. A digest of the enzyme containing extract was carried out at a temperature of approximately 170°F. for approximately 1 hour and the enzyme deactivated. Formol Nitrogen value of the digest was 9.0. After digestion, the solution was passed through a tower containing approximately 12 cubic feet of anionic exchange resin, at a rate of 2 gallons per minute. The pH of the composite sample of the effluent is approximately 8.7. The pH of the solution adjusted to 5.5 with citric acid has, measured at 1 percent solution a Lovibond color of 1.0 yellow/0.0 red.

EXAMPLE III

Portion C of the liquid product of Example I was diluted to 40 percent solids, was filtered and the solution was passed through a tower containing approximately 4 cubic feet of anionic exchange resin. The pH of the solution was adjusted to 6.0 with citric acid and approximately 10 pounds of the 10 percent solution of papain added. A digest of the enzyme containing extract was carried out at a temperature of about 140°F. for approximately 19 hours. Formol Nitrogen value of the digest at the end of one hour was 10.9 at the end of 2 hours was 11.3, and at the end of 10 hours was 12.6. The product of 10 hours digestion was heated to deactivate the enzyme and the solution was reconcentrated to 55 percent solids.

EXAMPLE IV

Portion D of the liquid product of Example I which has a pH of approximately 6 was diluted to 40 percent solids, was filtered and was passed through a tower containing approximately 4 cubic feet of anionic exchange resin and then through a tower containing approximately 4 cubic feet of cationic exchange resin. After portion D has passed through the tower at the rate of 2 gallons per minute, the pH of a composite sample of the effluent is approximately 5.5.

To this ion exchanged extract is added approximately 17.5 pounds of papain in a 10 percent solution so as to produce in the extract a papain content of 0.35 percent. And approximately 0.1 percent of methyl paraben plus 0.016 percent propyl paraben.

The enzyme containing material was held at a temperature of 140°F. for a total of 19 hours. The Formol Nitrogen value of the digest at one-half hour was 9.5, at 1 hour 11.2, at 3 hours 12.9, and at 19 hours 17.

The products as prepared above may be incorporated in aqueous solutions in various forms including aqueous and aqueous-alcoholic solutions, emulsions, creams, lotions, and the like. They may consist of one or more phases at least one of which must be aqueous. For instance, the hair preparation may consist of a single aqueous or aqueous-monohydric or polyhydric alcohol phase or may comprise an aqueous and a separate oily phase as in two layer systems or emulsions of the water in oil or oil in water type. The proteinaceous material of this invention may be present in said compositions in amounts in the range between about 5 percent and about 60 percent by weight.

The instant compositions and their constituents are skin-compatible, being suitable for periodic use at short, i.e., daily or at the most weekly, intervals as distinguished from decorative or treating composition such as hair dyeing or waving compositions which can be used only at much greater intervals. Thus it is contemplated that the present cosmetic compositions may be prepared in the form of decorative or treating compositions such as hair dressings, hair tonics, and the like, in which case the non-volatile toilet agent for the daily care of the hair is a hair grooming agent, or they may be prepared in the form of hair cleansing products such as shampoos, in which case the non-volatile toilet agent for the daily care of the hair is a detergent material. In both hair grooming and hair cleansing compositions, however, the non-volatile toilet agent for the daily care of the hair is normally present in an amount in the range between from 0.5 percent and 65 percent by weight of the composition.

In the case of hair grooming compositions, examples of agents which facilitate grooming of the hair and help to keep the hair in place include, e.g., castor oil, mineral oil, lower alkoxypolyoxy lower alkylene glycols such as butoxypolyoxy propylene glycol, higher molecular weight copolymers of random mixtures of ethylene oxide and propylene oxide, esters of fatty acids such as isopropylmyristate or the coconut oil fatty acid ester of polyethylene glycol having an average molecular weight of about 400, polyhydric alcohols such as glycerol and propylene glycol, gums such as gum tragacanth, lacquers such as shellac, and the like. It is preferred to employ those substantially non-volatile organic grooming agents which have a molecular weight above about 75 and preferably above about 200 and which contain an alcoholic hydroxyl group such as the aforementioned glycols, polyhydric alcohols, polymerized alkylene oxides, and castor oil. The foregoing organic hair grooming materials desirably are employed in the instant hair grooming preparations in an amount from about 0.5 to 65 percent and preferably about 2 to 50 percent by weight of the composition.

In the case of hair cleansing compositions or shampoos, the non-volatile organic toilet agent for the care of the hair is a cleansing agent such as a water soluble organic detergent. Desirably this detergent is an anionic sulfate or sulfonate, i.e., sulfated or sulfonated compound having a hydrophobic substituent containing eight to 26 carbon atoms, preferably from 12 to 18 carbon atoms, per molecule.

Detergents of this preferred type which may be suitably employed include the sulfuric acid esters of polyhydric alcohols incompletely esterified with higher fatty acids, e.g., coconut oil monoglyceride monosulfate and tallow diglyceride monosulfate; the long chain pure or mixed alkyl sulfates such as lauryl sulfate, cetyl sulfate, and higher fatty alcohol sulfates derived from coconut oil; the hydroxy sulfonated higher fatty acid esters such as, e.g., higher fatty acid esters of 2,3-dihydroxy-propane sulfonic acid; the higher fatty acid esters of low molecular weight alkylol sulfonic acids, e.g., oleic acid ester of isethionic acid; the sulfated higher fatty acid alkylolamides such as, e.g., ethanolamide sulfates; the higher fatty acid amides of amine alkyl sulfonic acids, e.g., the lauric amide of taurine, and the like.

Other anionic synthetic detergents which may be employed in shampoos are the sulfonic acid salts of alkylated aromatic hydrocarbon compounds having an alkyl substituent containing eight to 26 carbon atoms. The aromatic portion of the molecule may be mono or polynuclear, e.g., benzene, toluene, xylene, naphthalene, phenanthrene, anthracene, etc., and may contain other substituents such as hydroxyl groups or short chain alkyl groups such as, e.g., in phenol, cresol, phenol ethers, toluene, xylene, etc. The long chain alkyl substituent of the alkylated aromatic molecule preferably is saturated and may be straight chain or branched. Representative long chain alkyl groups include the dodecyl, hexyl, octyl, nonyl, and decyl groups as well as mixed alkyls derived from fatty materials, cracked paraffins or polymers of lower mono olefins, etc. In general, the alkylated aromatic detergents employed will be a mixture of compounds having alkyl substituents of varying chain length since the chain length is dependent upon the sharpness of the fractionation of the aliphatic hydrocarbon used for the alkylation. The average chain length of the alkyl substituent should be in general from nine to 15 carbon atoms and preferably between 12 and 14 carbon atoms.

These various anionic detergents are employed in shampoos prepared in accordance with the present invention in the form of their water-soluble salts. Thus the detergents may be used in the form of their alkali salts, e.g., sodium, potassium or lithium salts, as well as in the form of salts of nitrogen containing bases, e.g., ammonium or lower alkylolamine salts such as mono-, di- and triethanolamine salts, and mixtures of various salts.

Other anionic detergents which may also be employed include water-soluble alkyl phosphates, sulfated ethylene oxide condensates of hydrophobic materials such as higher fatty acids, fatty alcohols, alkyl aromatic hydrocarbons and the like, sulfonated oils, soaps such as sodium, potassium and triethanolamine soaps of higher fatty acids containing from 12 to 18 carbon atoms as well as mixtures of soaps being especially useful such as sodium laurate, sodium palmitate, sodium oleate and the potassium and/or triethanolamine soaps of coconut oil, palm oil, and tallow fatty acids.

Further suitable organic detergents include nonionic detergents such as the lower alkylene oxide condensation products of hydrophobic compounds, e.g., the ethylene oxide condensation products with higher fatty acids, higher fatty alcohols or alkylated aromatic hydrocarbons, polypropylene glycols having a molecular weight greater than 900, amide and amine condensates such as fatty acid alkylol amides, e.g., N-bis (2-hydroxyethyl)-lauramide, and finally the condensation products of fatty acid chlorides with hydrolyzed natural proteins often referred to as lysalbinic acid derivatives.

Suitable detergents are furthermore the amphoteric detergents such as salts of the N-alkyl compounds of betaamino propionic acid wherein the alkyl group is derived from a fatty acid such as the mixture of coconut oil fatty acids.

Shampoos in accordance with the present invention may be prepared in various forms and may consist of one or more phases. The shampoos suitably may be prepared as a clear, homogeneous, single phase liquid such as an aqueous or aqueous-alcoholic composition, or they may contain two or more liquid or mixed liquid and solid phases, as in the case of cream shampoos, lotion shampoos, past shampoos, and the like. The foregoing detergents desirably comprise at least about 5 percent and preferably from about 15 to 40 percent of the instant shampoos, and may be substantially higher in the case of solids-containing products, e.g., pastes.

The polypeptides of non-antigenic character because of their nutrient value for microorganisms should be used in conjunction with a small amount of suitable preservative when compounding a cosmetic cream. When preparing an improved skin cream, the polypeptides can be incorporated in any good cream base in the amount of about 3 to 15 percent. In preparing such skin creams having the purpose of being a skin moisturizer or enhancer of absorption of water, the polypeptides of Formol Nitrogen value are dissolved in the water phase prior to addition of the water phase to the oil phase in the emulsion or cream formation.

A typical cosmetic cream may be prepared as a water-in-oil emulsion wherein the oil phase and aqueous phase have the following compositions.

| COMPONENT | % BY WEIGHT |
| --- | --- |
| Oil Phase | |
| Lanolin Extract (AMERCHOL L 101) | 5.0 |
| Acetylated Polyoxyethylene Derivative of Lanolin (SOLULAN 98) | 2.0 |
| Cetyl Alcohol | 2.0 |

| | |
|---|---|
| Glycerine (ARLACEL 165) | 4.0 |
| Glyceryl Monostearate | 4.0 |
| Propyl Paraben | 0.02 |
| Aqueous Phase | |
| Water | 71.18 |
| Polypeptide FN 12.6 | 9.00 |
| Carboxy Vinyl Polymer (CARBAPOL 940) | 1.00 |
| Methyl Paraben | 0.2 |
| Formalin | 0.2 |
| Triethanolamine | 1.40 |

Although we have described preferred embodiments of the present invention, it will be understood that the invention is designed to be illustrative rather than restrictive, as details may be modified or changed without departing from the spirit or the scope of the invention.

We claim:

1. A composition for the conditioning of hair comprising water and 5 to 60 percent by weight of polypeptides having a Formol Nitrogen value in the range between 8 and 17 which are the product of subjection of collagen-containing material selected from the group consisting of bones, skins, hides, sinews and fatty tissues, to heat for a period in the range between 2 and 5 hours at temperatures in the range between about 250°F. and 350°F. and at gauge pressures in the range between about 35 pounds and 65 pounds in the presence of aqueous solution under conditions of temperature, pressure and time whereby the gel-forming character of the protein hydrolysate is reduced by said heat treatment, removing anions from the protein hydrolysate by ion exchange with anionic exchange resins selected from the group consisting of weak base primary amines, strong base quaternary ammonium hydroxide, and intermediate base tertiary amine, further hydrolyzing the hydrolysate with enzyme material having proteolytic activity selected from the group consisting of papain, bromelin, ficin and trypsin at temperatures in the range between 100°F. and 180°F. to produce polypeptides of Formol Nitrogen value in said specified range and heat treating the polypeptide solution at temperatures in the range between about 195°F. and 215°F. to arrest enzyme action.

2. The composition of claim 1 having a Formol Nitrogen value in the range between about 9 and 14.

3. The composition of claim 1 wherein the polypeptides are water soluble over the full pH range of 1 to 12.

4. The composition of claim 1 wherein the composition is a hair shampoo.

5. The composition of claim 1 wherein the composition is a solution for bleaching hair.

6. The composition of claim 1 wherein the composition is a hair waving lotion.

7. The composition of claim 1 wherein the composition is a water solution containing 6 percent of ammonium thioglycollate and between about 5 percent and 10 percent, based upon total weight of the composition, of said polypeptides.

8. A method of treating hair to provide a sorbed protective and conditioning content of proteinaceous materials comprising contacting the hair with an effective amount of the composition of claim 1 and washing the hair whereby adhering polypeptides are removed and sorbed polypeptides are retained in the hair.

9. The method of claim 8 in which the composition comprises a hair bleach solution.

10. The method of claim 8 in which the composition comprises a hair waving lotion.

11. The method of claim 8 in which the composition comprises a hair shampoo.

* * * * *

UNITED STATES PATENT OFFICE
CERTIFICATE OF CORRECTION

Patent No. 3,683,939      Dated August 15, 1972

Inventor(s) Vernon L. Johnsen and Raymond S. Burnett

It is certified that error appears in the above-identified patent and that said Letters Patent are hereby corrected as shown below:

Column 1, line 55, "door" should be -- odor --.

Column 3, line 42, "aqueous" should be -- vary --.

Column 4, line 31, "mater" should be -- matter --.

Column 5, line 57, "preferably" should be -- preferable --.

Column 12, line 40, "past" should be -- paste --.

Signed and sealed this 8th day of May 1973.

(SEAL)
Attest:

EDWARD M. FLETCHER, JR.
Attesting Officer

ROBERT GOTTSCHALK
Commissioner of Patents

UNITED STATES PATENT OFFICE
Certificate

Patent No. 3,683,939                                      Patented July 31, 1973

Vernon L. Johnsen and Raymond S. Burnett

Application having been made by Vernon L. Johnsen and Raymond S. Burnett, the inventors named in the patent above identified, and Wilson Pharmaceutical & Chemical Corporation, a corporation of Delaware, the assignee, for the issuance of a certificate under the provisions of Title 34, Section 256, of the United States Code, adding the name of Eugene V. Matern as a joint inventor, and a showing and proof of facts satisfying the requirements of the said section having been submitted, it is this 2nd day of July 1974, certified that the name of the said Eugene V. Matern is hereby added to the said patent as a joint inventor with the said Vernon L. Johnsen and Raymond S. Burnett.

FRED W. SHERLING,
                                                                                        *Associate Solicitor.*